May 3, 1932.  W. V. SEIFERT  1,856,437
DRILL BIT
Filed Jan. 28, 1929   2 Sheets-Sheet 2
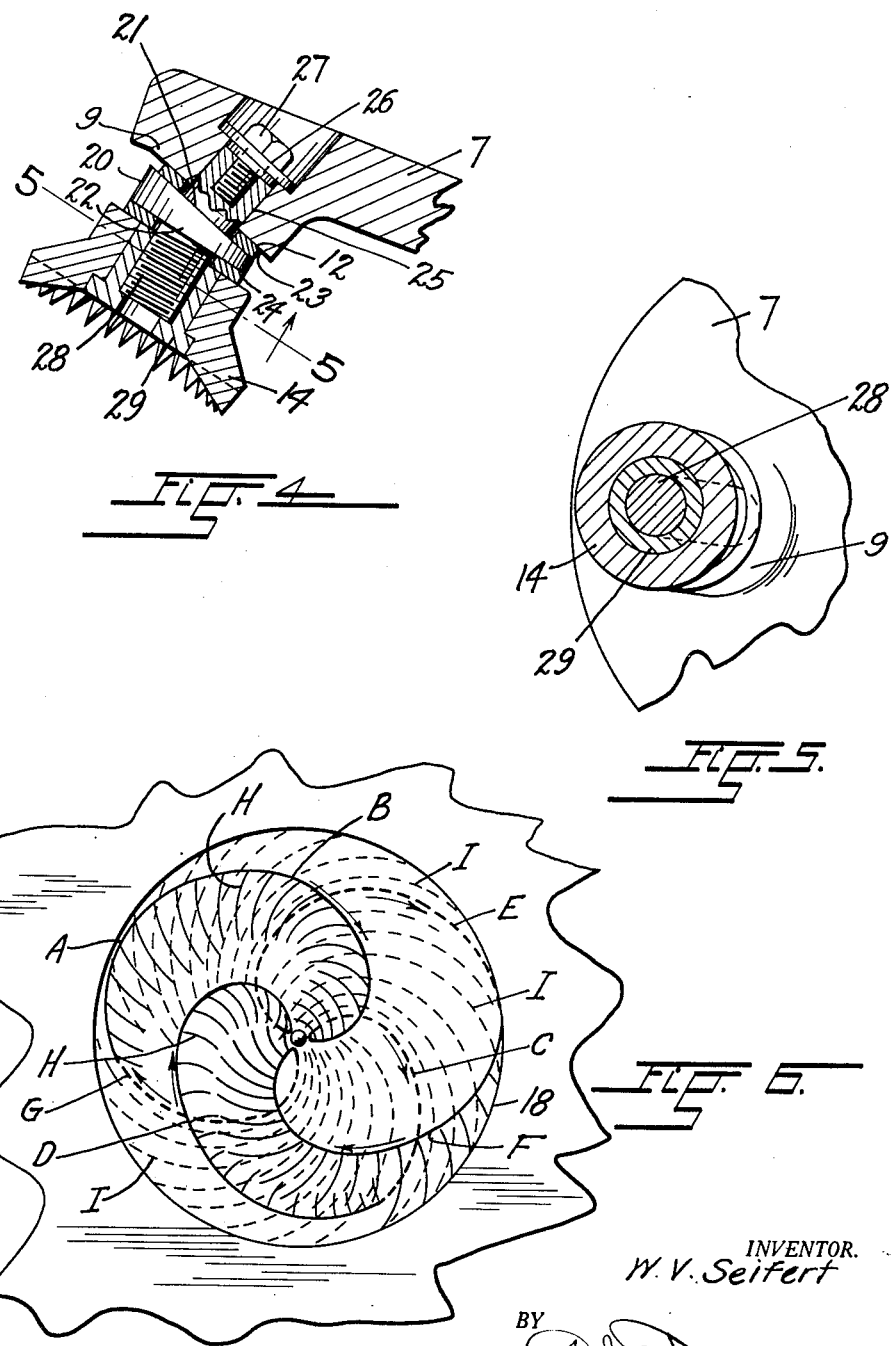
INVENTOR.
W. V. Seifert
BY
ATTORNEY.

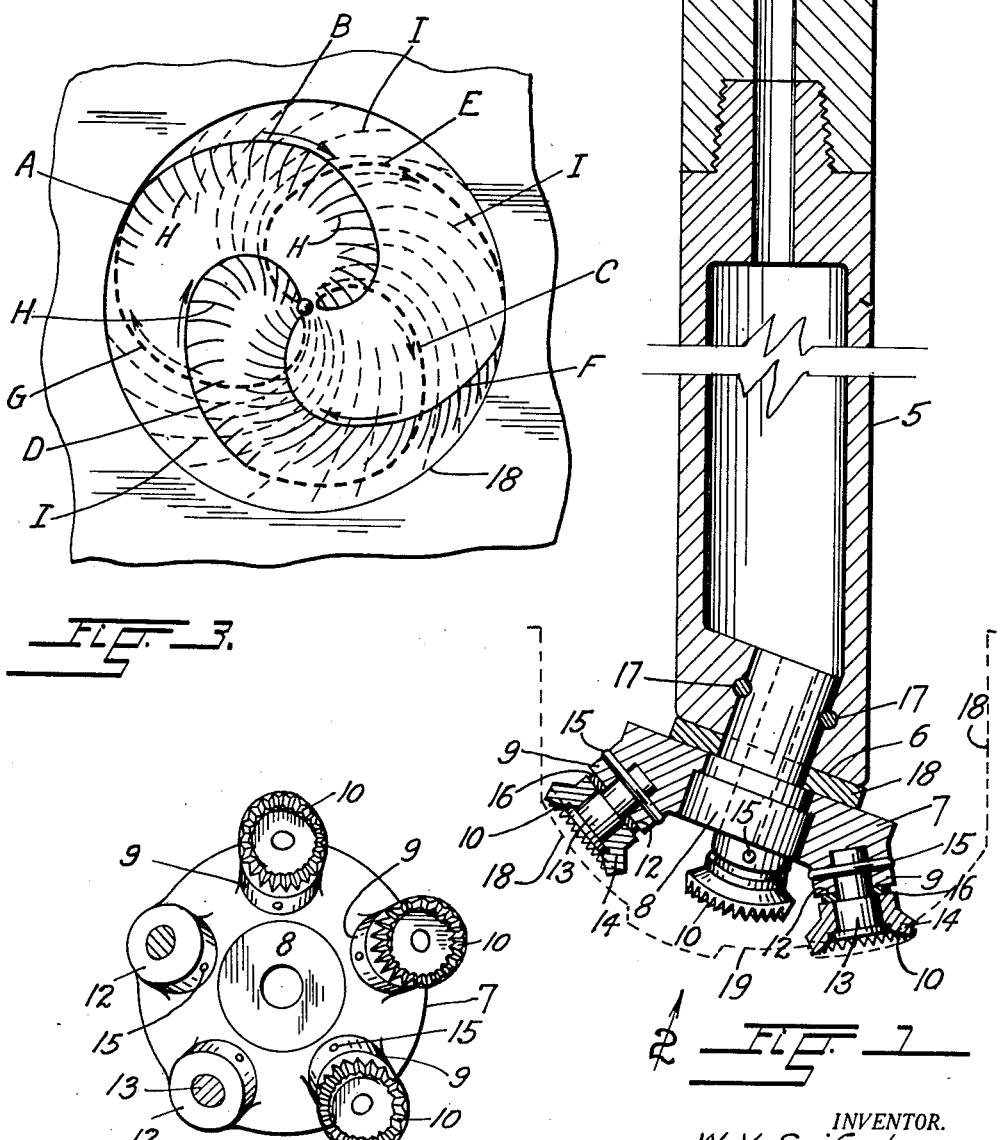

Patented May 3, 1932

1,856,437

UNITED STATES PATENT OFFICE

WILLIAM V. SEIFERT, OF DENVER, COLORADO

DRILL BIT

Application filed January 28, 1929. Serial No. 335,461.

This invention relates to boring tools of the type used in drilling wells and its principal object resides in providing in association with a driven rotary stem, a rotary head and rotary cutting-members on the head, arranged relative to each other to compel the cutting members to traverse a formation into which the tool advances, in a gyrating motion.

Another object of the invention is to provide an arrangement of rotary cutters mounted on a rotary drill stem so that during rotary movement of the latter they will alternately rotate and drag, whereby to bore into the rock or other formation with little effort and whereby the cutters are automatically resharpened after each cutting action.

Other objects of the invention will be brought out in the course of the following description.

In the accompanying drawings, illustrating an embodiment of the invention in practical form, Figure 1 represents a sectional elevation of the tool in connection with the end-portion of a rotary drill stem, Figure 2, an end-view of the cutter-head of the tool, looking in the direction of the arrow 2 in Figure 1, Figure 3, a diagrammatic view of the paths traversed by the cutters of the tool in the operative movement thereof.

Figure 4, an enlarged fragmentary section showing a modified method of mounting the rotary cutters on the rotary head of the tool, Figure 5, a section taken on the line 5—5, Figure 4, and Figure 6, a diagrammatic view similar to Figure 3, showing the paths traversed by the cutters of a tool of the modified construction illustrated in Figure 4.

Like characters of reference designate corresponding parts throughout the views.

The reference numeral 5 designates a sectional tubular drill stem which in the operation of the tool is rotated by a driving mechanism connected at the upper end thereof. The stem has an end-face 6 oblique to its axis of rotation, to provide a bearing for a rotary cutter head 7.

The cutter head comprises a circular body rotatably mounted on a headed arbor 8.

The head has upon its outer face, a plurality of circular bosses 9 disposed at equal distances from the axis of the arbor, and having their outer faces in planes slanting in beveled relation to a plane at right angles to the axis of rotation of the head. The bevel-faces 12 of the head, provide bearings for rotary cutters 10, each consisting of a headed stem 13, and a bit 14 mounted for rotation upon the head of the stem.

The bit is circular and beveled at its circumference and it has in its outer face, a series of teeth of preferably V-shaped section, that extend into the bevel.

The bosses on the head have bores at right angles to their bevel-faces, to receive the stems of the cutters, and the stems are held against rotary movement and against longitudinal displacement by pins 15 driven through openings transverse to the stems, complementary halves of which are formed in the circumferential surfaces of the stems and the walls of the respective bores of the head. Wear rings 16 between the bevel-faces 12 of the head and the bits, may be renewed in case of wear or breakage.

The drill stem has, at right angles to its oblique endface 6, a bore for the arbor of the cutting-head and the arbor is held against rotation and against longitudinal displacement by pins 17 arranged in complementary grooves of the arbor and the stem in a manner similar to that hereinabove described with relation to the rotary cutters on the head. A wear ring 18 is disposed between the head and the bearing face of the drill stem.

When the stem is caused to rotate about its axis, the head 7 describes a circle 18, the radius of which is equal to the distance of the outermost part of its outermost cutting-member from the axis of rotation of the stem.

By reason of the contact of the cutters with the work, the head rotates about its own axis on the stem, which extends at an obtuse angle to the axis of rotation of the stem, and the cutters are by the same cause compelled to turn about their individual axes of rotation during part of the rotary movement of the head.

The gyratory motion imparted to the head brings its cutter-members successively into engagement with the breast of the work, indicated at 19 in the drawings, and the paths traversed by each cutter have been diagrammatically indicated in Figure 3.

Commencing at the point A corresponding with the outermost position of one of the drill bits with relation to the axis of rotation of the drill stem, the drill bit advances in a curvilinear path B to the center of the breast, which is coincident with the axis of rotation of the tool. During this action the bit is caused to rotate about its own axis because it is driven forwardly in constant engagement with the work.

During continued rotation of the tool the bit recedes from the center toward the circumference of the circle it describes in the rotary movement of the drill stem, in a curved path C and during this movement it does not rotate about its own axis but drags until it again enters upon a forward motion when it moves toward the center along a curved line D.

During the continued motion of the head with the drill stem, the cutter again recedes in a dragging motion from the center to the circumference of the circle in a curved path indicated at E, it subsequently again moves to the center along a curved line F in a rotary movement, and finally recedes from the center to the point of beginning in the circumference of the circle in a dragging motion along a curved line G.

During the rotary motion of the cutters, they cut into the formation as indicated by the short cut lines H, and during the dragging movement of the cutters they route or groove the breast of the work, as indicated by the longer lines I. The cuts traverse the grooves and the formation is thus readily penetrated.

It will be apparent that in the above described manner each bit traverses the entire area of the breast of the work and during the dragging motion of the cutters the ends of their teeth are ground and sharpened so that the tool will maintain its operative condition until the cutting parts of the bits are entirely worn away.

The head makes one revolution during each three revolutions of the stem, and during each complete movement of the head about the axis of rotation of the stem, each cutter makes its circuit of operation, as hereinbefore described.

In the modified construction illustrated in Figures 4 to 6, the bits 14 are mounted to rotate about axes at an oblique angle to the respective bevel-faces 12 of the head. At this angle, the cutting actions of the bits are prolonged as indicated in Figure 6, the short cut lines H are lengthened and the formation is cut during every rotation of the head to a correspondingly greater depth.

The mounting further permits of varying the angle of the axes of rotation of the bits to the axis of the head by the provision of stems of different angular relations between their shank by which they are fastened on the head and their studs upon which the cutters rotate. A convenient and practical mounting of this character has been illustrated in Figures 4 and 5.

The stem has a circular head 20, the flat faces 21 and 22 of which are nonparallel. One of the faces lies flat against the respective bevel face of the head or against a wear ring 23, and the other face provides a bearing surface for the cutter preferably through the intermediary of a wear ring 24.

At right angles to the face 21 is a shank 25 fitted in a central opening of the corresponding boss 9 of the rotary drill head and held in place by a washer 26 engaging a shoulder at the inner end of the opening and a machine screw 27 screwed into a corresponding threaded axial bore of the shank, against the washer.

At right angles to the face 22 of the head 20 of the mounting, is a screw threaded stud 28 upon which the cutter is rotatably supported by means of a headed bushing 29 which is screwed upon the stud.

The shape of the bottom of the hole produced in the operation of the tool, as shown in Figure 1, braces the tool against lateral displacement, thereby maintaining the axis of rotation in a fixed position and producing a hole of uniform radius around said axis.

The cutters in their orbitary movements around the axis form transversely grooved paths and each cutter meshes in its own track and thereby insures its constant operative motion about its own axis of rotation.

Another distinctive feature in the operation of the tool is that its cutter head may produce a hole of larger diameter than that through which it is initially passed.

Having thus described my invention what I claim and desire to secure by Letters Patent is:

1. A drill-tool comprising a rotary stem, a head mounted on the stem to rotate about an axis oblique to the axis of rotation of the stem, and a cutter mounted on the head to rotate about an axis oblique to the axis of rotation of the head.

2. A drill-tool comprising a rotary stem, a head mounted on the stem to rotate about an axis oblique to the axis of rotation of the stem, the head being provided with a face slanting away from its axis of rotation, and a cutter bearing on said face and mounted to rotate about an axis at right angles to the same.

3. A drill-tool comprising a rotary stem, a head mounted on the stem to rotate about an axis oblique to the axis of rotation of the stem, and a plurality of cutters on the head in a circle concentric with the axis of rotation of the same, each cutter being mounted to rotate about an axis oblique to the axis of rotation of the head.

4. A drill-tool comprising a rotary stem, a head mounted on the stem to rotate about an axis oblique to the axis of rotation of the stem, and a cutter mounted on the head to rotate about an axis oblique to the axis of rotation of the head, the cutter having a circular series of teeth facing outwardly from the head.

5. A drill-tool comprising a rotary stem, a head mounted on the stem to rotate about an axis oblique to the axis of rotation of the stem, and a cutter mounted on the head to rotate about an axis oblique to the axis of rotation of the head, the cutter having a bevel-edged end facing outwardly from the head, and teeth that extend into said bevel-edge.

In testimony whereof I have affixed my signature.

WILLIAM V. SEIFERT.